United States Patent
Kowaczyk et al.

(10) Patent No.: US 11,492,048 B1
(45) Date of Patent: Nov. 8, 2022

(54) FRONT FENDER COVER ATTACHMENT ASSEMBLY FOR A VEHICLE

(71) Applicant: Nissan North America, Inc., Franklin, TN (US)

(72) Inventors: Michael Kowaczyk, Waterford, MI (US); Kyle Gunther, Royal Oak, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 17/364,753

(22) Filed: Jun. 30, 2021

(51) Int. Cl.
| | |
|---|---|
| *B62D 25/16* | (2006.01) |
| *B60R 13/06* | (2006.01) |
| *B60J 10/70* | (2016.01) |
| *B62D 25/08* | (2006.01) |
| *B62D 25/04* | (2006.01) |
| *B62D 25/02* | (2006.01) |
| *B60R 13/04* | (2006.01) |

(52) U.S. Cl.
CPC ............ *B62D 25/081* (2013.01); *B60R 13/04* (2013.01); *B60R 13/06* (2013.01); *B62D 25/02* (2013.01); *B62D 25/04* (2013.01); *B62D 25/165* (2013.01); *B62D 25/16* (2013.01)

(58) Field of Classification Search
CPC .... B62D 25/16; B62D 25/165; B62D 25/081; B60R 13/04; B60R 13/06; B60J 10/70
USPC .............................. 296/192, 93, 84.1, 198, 29
See application file for complete search history.

(56) References Cited

U.S. PATENT DOCUMENTS 9,561,756 B2 * 2/2017 Polovich ................. F16B 5/065
10,829,060 B2 11/2020 Fujiki et al.

FOREIGN PATENT DOCUMENTS

| JP | S645848 U | * | 1/1989 |
| JP | 4029716 B2 | * | 1/2008 |

* cited by examiner

*Primary Examiner* — Dennis H Pedder
(74) *Attorney, Agent, or Firm* — Global IP Counselors, LLP (57) ABSTRACT

A front fender cover attachment assembly for a vehicle includes a windshield molding, a hook assembly, a front fender cover, and an engaging member. The windshield molding is configured to receive a windshield. The hook assembly is connected to an end of the windshield molding. The front fender cover is configured to engage the hook assembly of the windshield molding. The engaging member is connected to the front fender cover and configured to engage the hook assembly. A free end of the hook assembly extends in a vehicle inboard direction.

20 Claims, 8 Drawing Sheets

FRONT FENDER COVER ATTACHMENT ASSEMBLY FOR A VEHICLE

BACKGROUND

Technical Field

The present disclosure generally relates to a front fender cover attachment assembly for a vehicle. More specifically, the present disclosure relates to a front fender cover attachment assembly that facilitates installation of a front fender cover.

Background Information

A front fender cover is installed by engaging an engaging member of the front fender cover with a hook assembly of a windshield molding. The installation direction of the front fender cover is not aligned with a direction in which a hook of the hook assembly extends. The installation direction not being aligned with the extension direction of the hook results in a difficult installation procedure for the front fender cover. The front fender cover is often improperly or incompletely installed such that the front fender cover is prone to movement.

SUMMARY

A need exists for a front fender cover attachment assembly that facilitates installation of a front fender cover.

In view of the state of the known technology, one aspect of the present disclosure is to provide a front fender cover attachment assembly for a vehicle including a windshield molding, a hook assembly, a front fender cover, and an engaging member. The windshield molding is configured to receive a windshield. The hook assembly is connected to an end of the windshield molding. The front fender cover is configured to engage the hook assembly of the windshield molding. The engaging member is connected to the front fender cover and configured to engage the hook assembly. A free end of the hook assembly extends in a vehicle inboard direction.

Another aspect of the present invention is to provide a front fender cover attachment assembly for a vehicle including a windshield, a cowl cover supporting the windshield, and a windshield molding engaging a perimeter of the windshield. A first hook assembly is connected to a first end of the windshield molding. A first front fender cover engages the first hook assembly of the windshield molding and is connected to the cowl cover. A first engaging member is connected to the first front fender cover engaging the first hook assembly. A first free end of the first hook assembly extends in a vehicle inboard direction.

Also other objects, features, aspects and advantages of the disclosed front fender cover attachment assembly for a vehicle will become apparent to those skilled in the art from the following detailed description, which, taken in conjunction with the annexed drawings, discloses exemplary embodiments of the front fender cover attachment assembly for a vehicle.

BRIEF DESCRIPTION OF THE DRAWINGS

Referring now to the attached drawings which form a part of this original disclosure.

DETAILED DESCRIPTION OF EXEMPLARY EMBODIMENTS

Selected embodiments will now be explained with reference to the drawings. It will be apparent to those skilled in the art from this disclosure that the following descriptions of the exemplary embodiments are provided for illustration only and not for the purpose of limiting the invention as defined by the appended claims and their equivalents.

Referring initially to FIGS. 1-4, a vehicle 10 including a front fender cover attachment assembly 12 is illustrated in accordance with an exemplary embodiment of the present invention. The vehicle 10 includes a body structure 14 that defines a passenger compartment 16. The body structure 14 also defines a cowl area 18 at a vehicle forward base of a windshield 20. A pair of front fenders 22 are attached to a portion of the vehicle body structure 14 in any suitable manner, such as with mechanical fasteners. An engine compartment 24 is defined between the front fenders 22 with a hood 26 covering the engine compartment 24. Vehicle body structures are conventional structures well-known in the art, such that further description of the vehicle body structure 14 is omitted, except where necessary, for the sake of brevity.

The cowl area 18 extends along a forward lower area of the windshield 20, as shown in FIGS. 1-4, and includes a removable cowl cover 28 that covers the cowl area 18, and allows water to pass therethrough into the cowl area 18. The cowl area 18 includes water outlets (not shown) that allow water collected from the windshield 20 to drain to areas under the vehicle body structure 14 in a conventional manner. The cowl cover 28 is fixed to the vehicle body structure 14 by fasteners (not shown) that hold the cowl cover 28 in place over the cowl area 18 in a conventional manner. The cowl cover 28 supports the windshield 20.

The windshield 20 is installed within a windshield opening defined by the vehicle body structure 14 in a conventional manner, as shown in FIGS. 1-4 and 12. The windshield 20 includes a windshield molding 30 that extends along the sides and top of the windshield 20. The windshield 20 is attached to the windshield molding 30 in a conventional manner.

Figure 1:
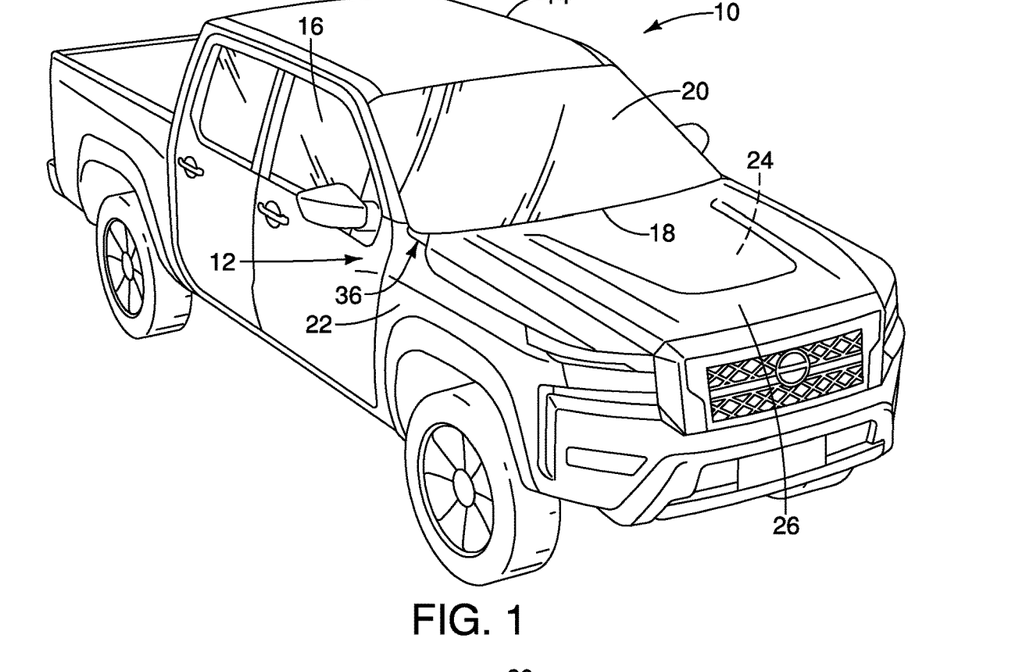
FIG. 1 is a perspective view of a vehicle including a front fender cover attachment assembly in accordance with an exemplary embodiment of the present invention.

The hood 26 is movable between a closed position, as shown in FIG. 1, and an open position (not shown). The hood 26 is movably supported by hood hinges (not shown) that facilitate moving the hood 26 between the open and closed positions.

A pair of front fender covers 36 are connected to the vehicle body structure 14, as shown in FIGS. 1-4. The front fender covers 36 are substantially identical and all of the features of one is also included on the other, except that they are symmetrical mirror images of one another. Specifically, a first of the front fender covers 36 is installed to the driver's side end of the cowl area 18 and a second of the front fender covers 36 is installed to the passenger's side end of the cowl area 18. Because the two front fender covers 36 include substantially identical features (mirror images of one another) description of one of the front fender covers 36 applies equally to the other of the front fender covers 36. Therefore, only one of the front fender covers 36 is described herein below for the sake of brevity.

As shown in FIGS. 6-8 and 11, the front fender cover 36 includes a main body 38 that has a trim, or inboard, surface 40, an attachment, or outboard, surface 42 and an outer peripheral edge 44. When the front fender cover 36 is installed to the cowl area 18, as shown in FIGS. 3, 4, 6 and 7, the trim surface 40 faces the cowl area 18 and the windshield 20.

The outer peripheral edge 44 extends around the main body 38 of the front fender cover 36. The outer peripheral edge 44 is located and extends between the trim surface 40 and the attachment surface 42. The outer peripheral edge 44 has a first edge section 50, a second edge section 52 that extends from an end of the first edge section 50, a third edge section 54 that extends from an end of the second edge section 52, and a fourth edge section 56 that extends from an end of the third edge section 54 to another end of the first edge section 50.

Figure 6:
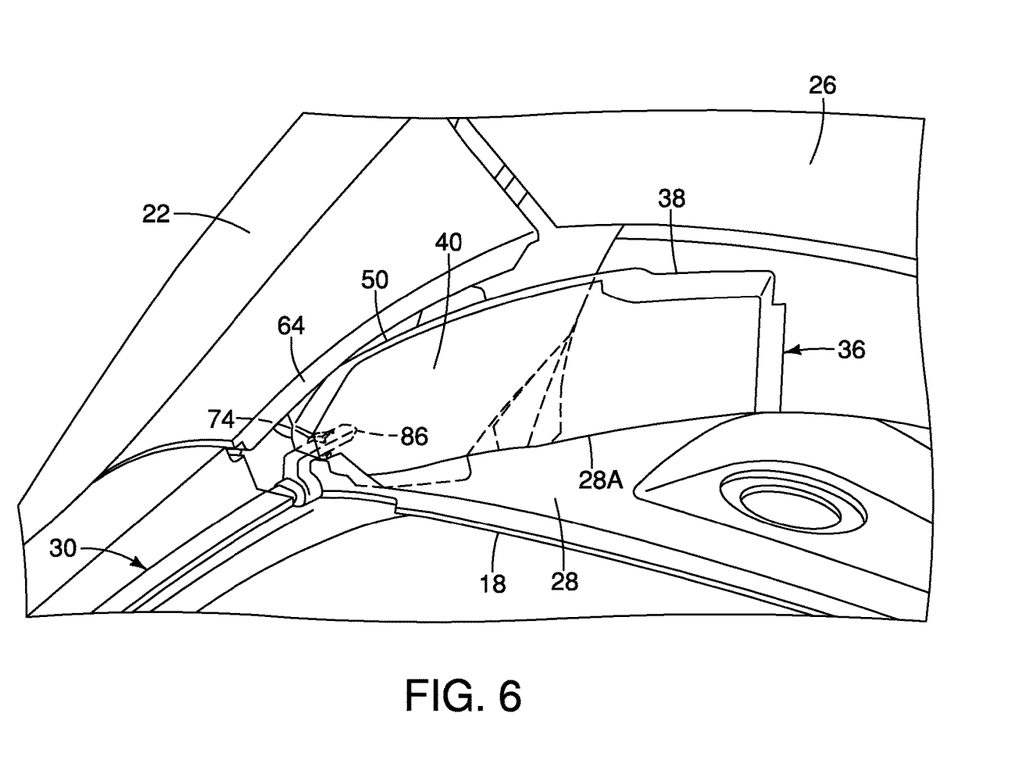
FIG. 6 is a perspective view of a front fender cover during installation.
Figure 10:
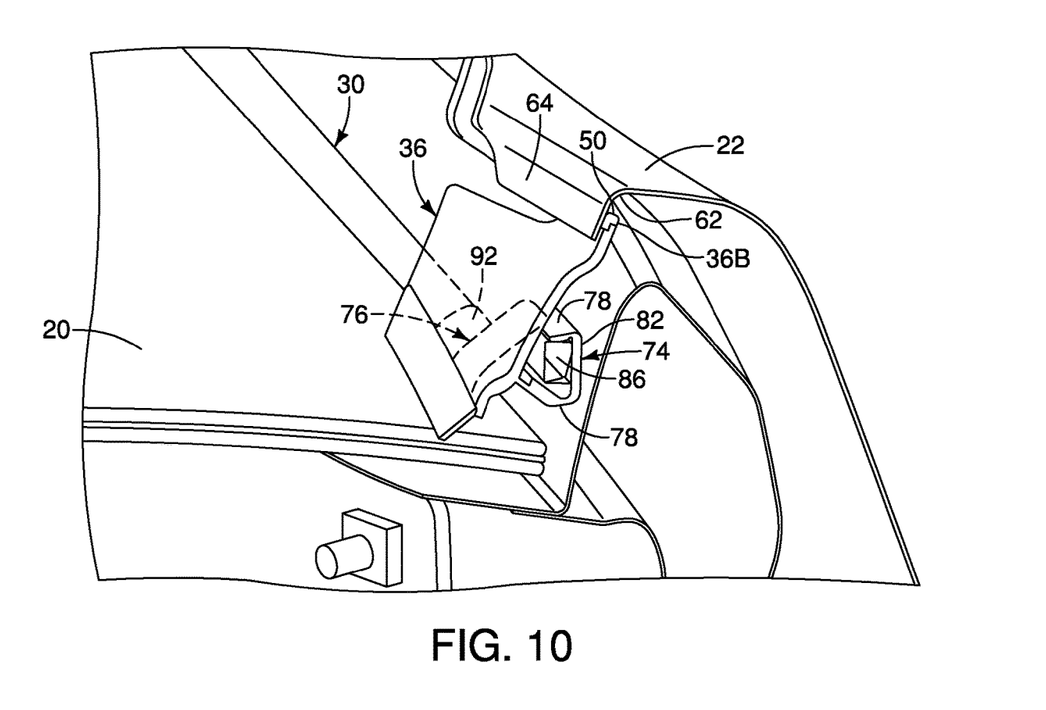
FIG. 10 is an elevational view in cross section of the engaging member engaging the hook of FIG. 9.
Figure 11:
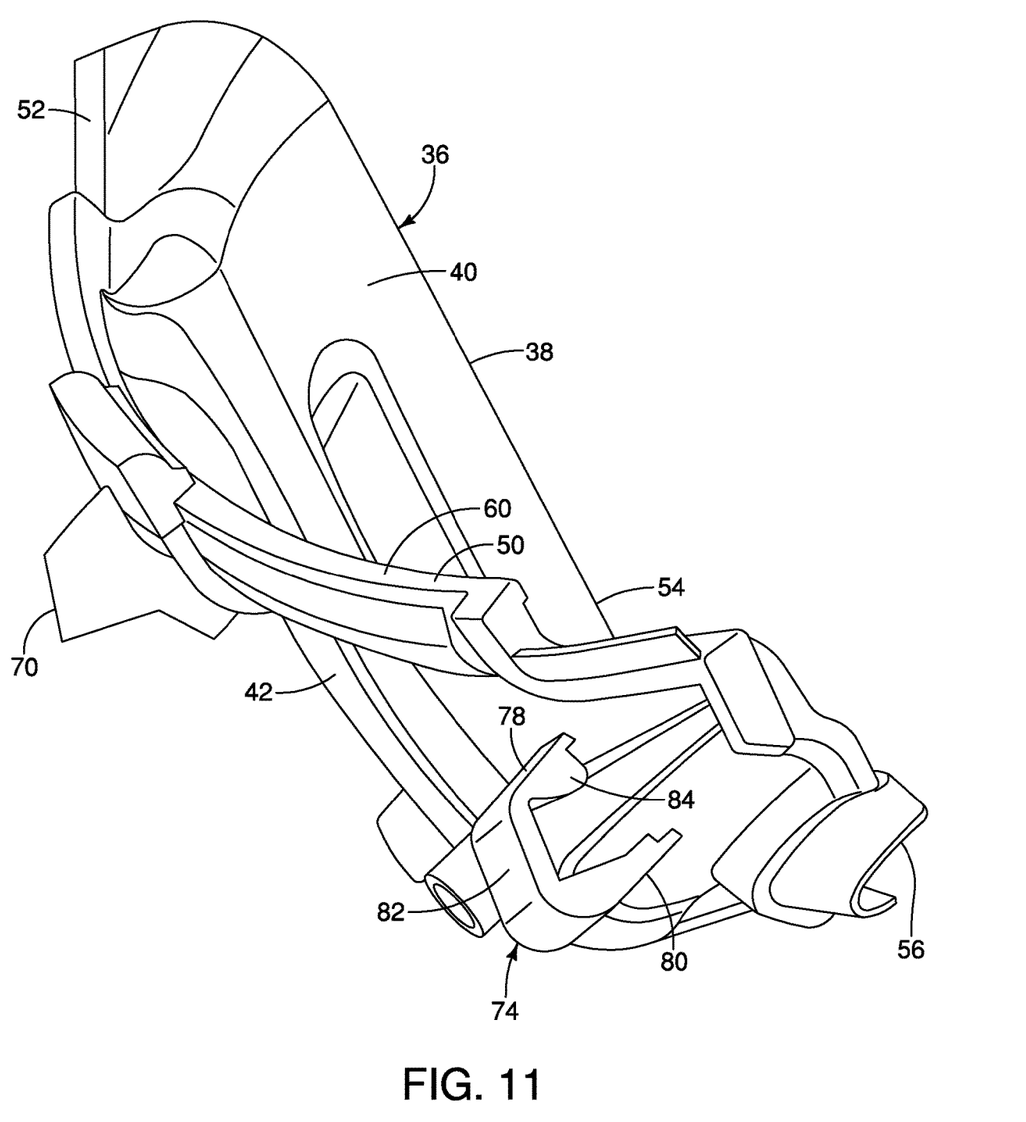
FIG. 11 is a perspective view of the front fender cover of FIG. 6.

The first edge section 50 of the outer peripheral edge 44 of the front fender cover 36 defines a fender attachment structure 60 that is dimensioned and configured such that the fender attachment structure 60 fits into a corresponding elongated recess 62 formed along an inboard edge section or flange 64 of the fender 24, as shown in FIGS. 6, 10 and 11.

The second edge section 52 of the front fender cover 36 defines an upper ledge 66 dimensioned and located to mate with a portion of the hood 26 with the hood 26 in a closed position, as shown in FIGS. 6-8 and 11.

The third edge section 54 of the front fender cover 36 defines a cowl cover section configured to contact and mate with an outboard portion 28a of the vehicle cowl cover 28 with the front fender cover 36 installed to the vehicle 10, as shown in FIGS. 6-8 and 11.

The fourth edge section 56 of the front fender cover 36 defines a windshield cover section and is configured to contact and mate with the windshield, as shown in FIGS. 6-8 and 11.

Figure 7:
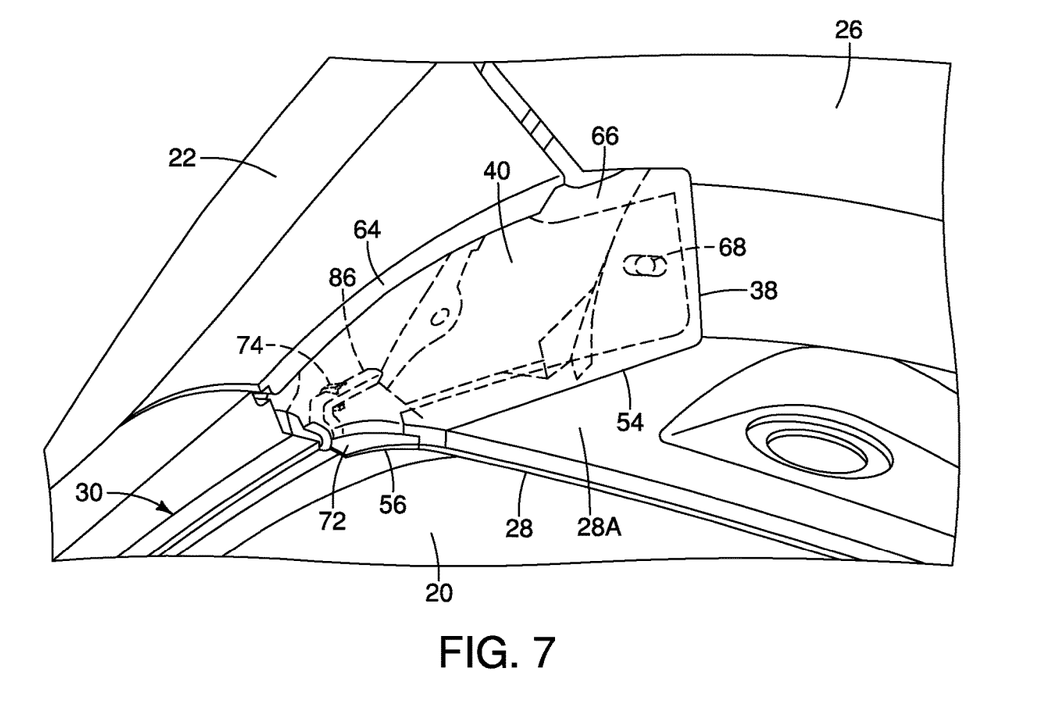
FIG. 7 is a perspective view of the front fender cover of FIG. 6 after installation.
Figure 8:
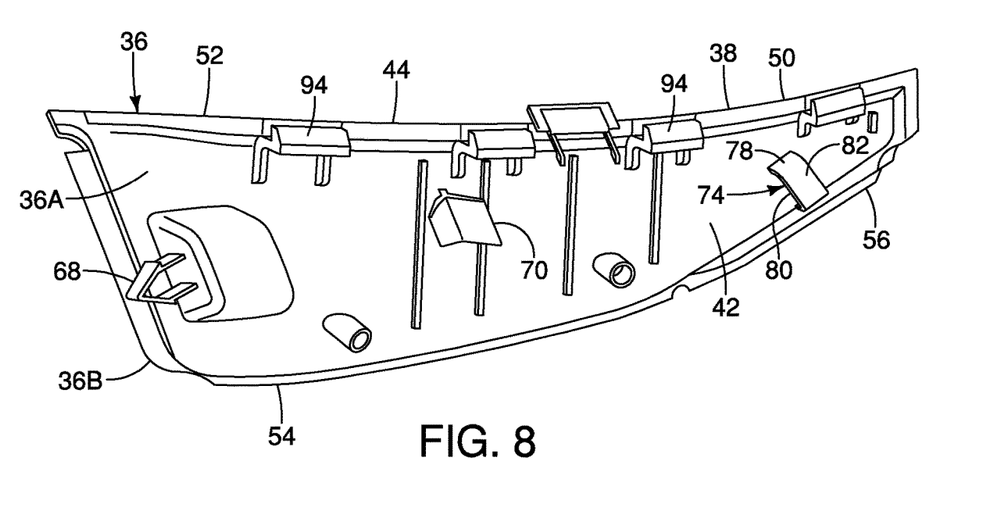
FIG. 8 is a bottom plan view of the front fender cover of FIG. 5.

As shown in FIGS. 7 and 8, the attachment surface 40 (the outboard surface 40) includes a snap-fitting projection 68 dimensioned to attach to a structure or portion 28a of the vehicle cowl cover 28. The snap-fitting projection 68 is fixed to a doghouse structure that is molded on the attachment surface 42.

The attachment surface 42 includes a projection 70 extending therefrom, as shown in FIG. 8. As describe further below, the projection 70 is oriented, dimensioned and positioned to contact a hood hinge pivot pin (not shown) with the front fender cover 36 installed to the vehicle body structure 10.

Figure 9:
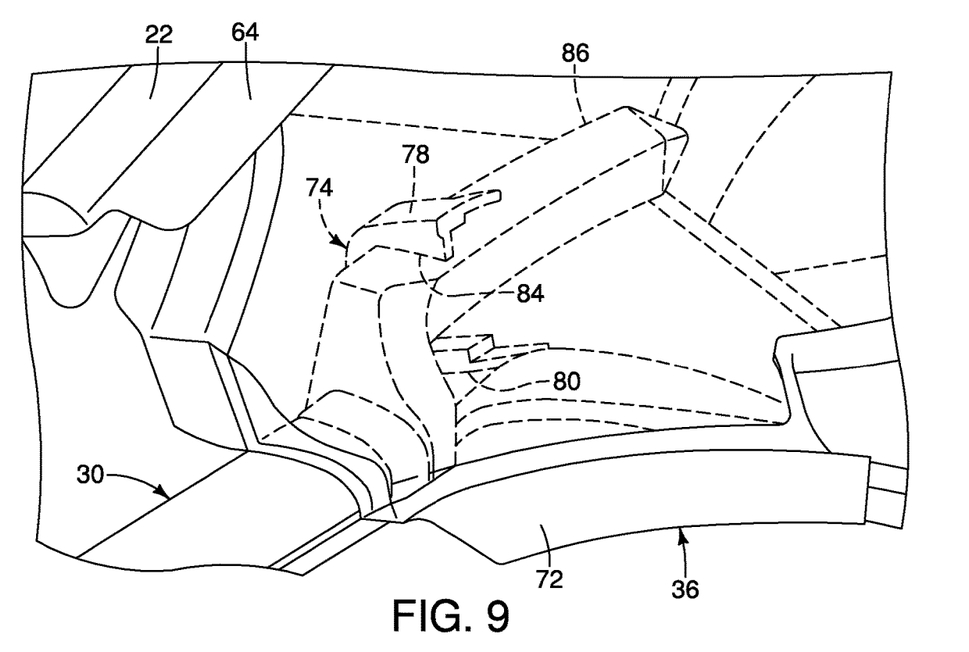
FIG. 9 is an enlarged perspective view of an engaging member of the front fender cover engaging a hook of a hook assembly connected to a windshield molding.

As shown in FIGS. 7 and 9, the fourth edge section 56 includes a windshield contacting lip 72 defined and/or formed along the fourth edge section 56 of the trim panel 14. The windshield contacting lip 72 presses against a portion of the windshield 20, creating a seal therebetween.

As shown in FIGS. 7 and 8, an engaging member 74 is connected to the attachment surface 42 of the front fender cover 36. In other words, the engaging member 74 is disposed on the attachment surface 42 of the front fender cover 36. The engaging member 74 is substantially U-shaped and configured to engage a hook assembly 76 of the windshield molding 30, as shown in FIGS. 6 and 7. The engaging member 74 includes an upper leg 78 and a lower leg 80 connected by a connecting portion 82. The upper and lower legs 78 and 80 are connected to the attachment surface 42 of the front fender cover 36 and the connecting portion 82 is spaced from the attachment surface 42 to define a substantially U-shaped member.

A protrusion 84 extends from the engaging member 74, as shown in FIG. 11. The protrusion 84 extends from an inner surface of the upper leg 78. In other words, the protrusion 84 extends in a direction toward the lower leg 80. The protrusion 84 is configured to contact a hook 86 of the hook assembly 76, as shown in FIG. 7, during installation of the front fender cover 36.

The front fender cover 36 preferably includes a first plastic portion 36A and a second plastic portion 36B, as shown in FIG. 8. The first plastic portion 36A defines a body of the front fender cover 36. The second plastic portion 36B is disposed on a perimeter of the first plastic portion 36B. The first plastic portion 36A is made of a hard plastic material to provide rigidity. The second plastic portion 36B is made of a soft plastic material to provide a seal with engaged components, such as the windshield 20, the front fender 22, and the cowl cover 28. The engaging member 74 is connected to the first plastic portion 36A. Preferably, the engaging member 74 is molded with the first plastic portion 36A as a unitary, one-piece member.

Figure 3:
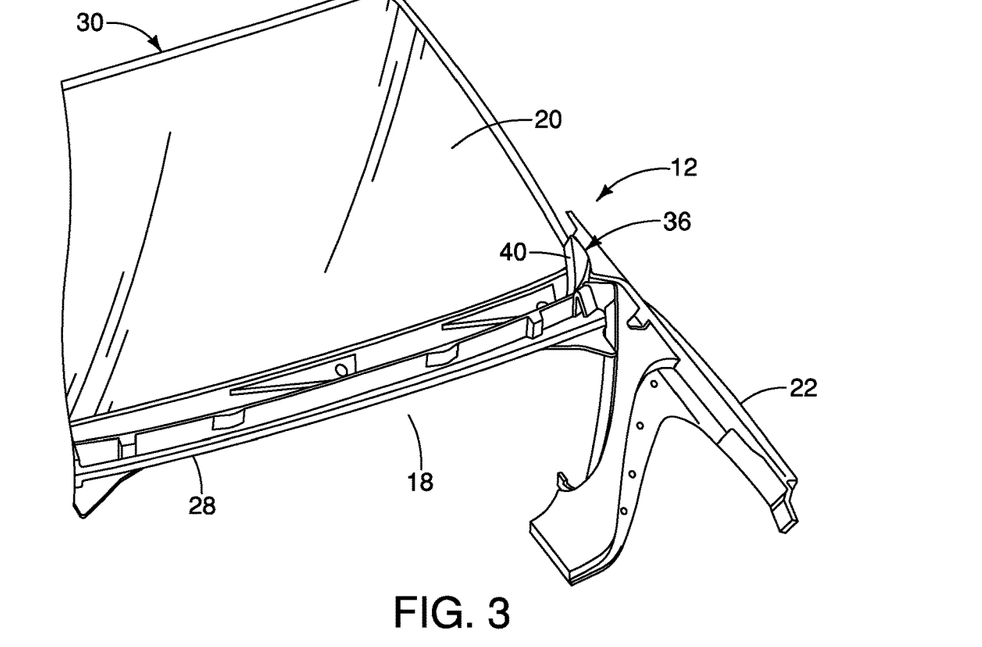
FIG. 3 is a perspective view of the front fender cover attachment assembly of FIG. 1 with the vehicle removed for clarity.
Figure 4:
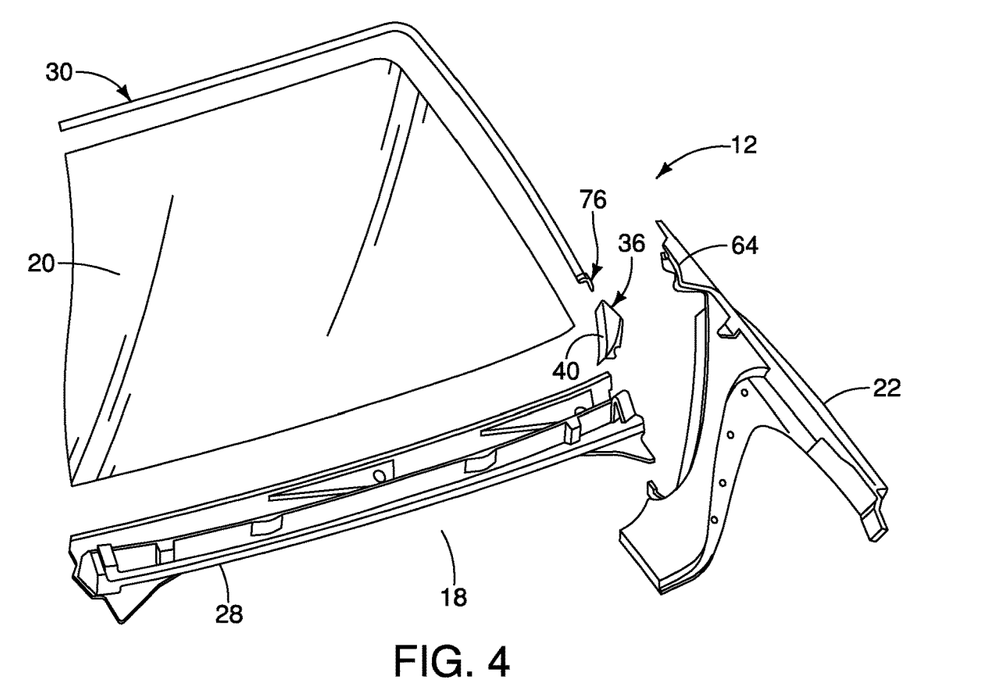
FIG. 4 is an exploded perspective view of the front fender cover attachment assembly of FIG. 3.
Figure 12:
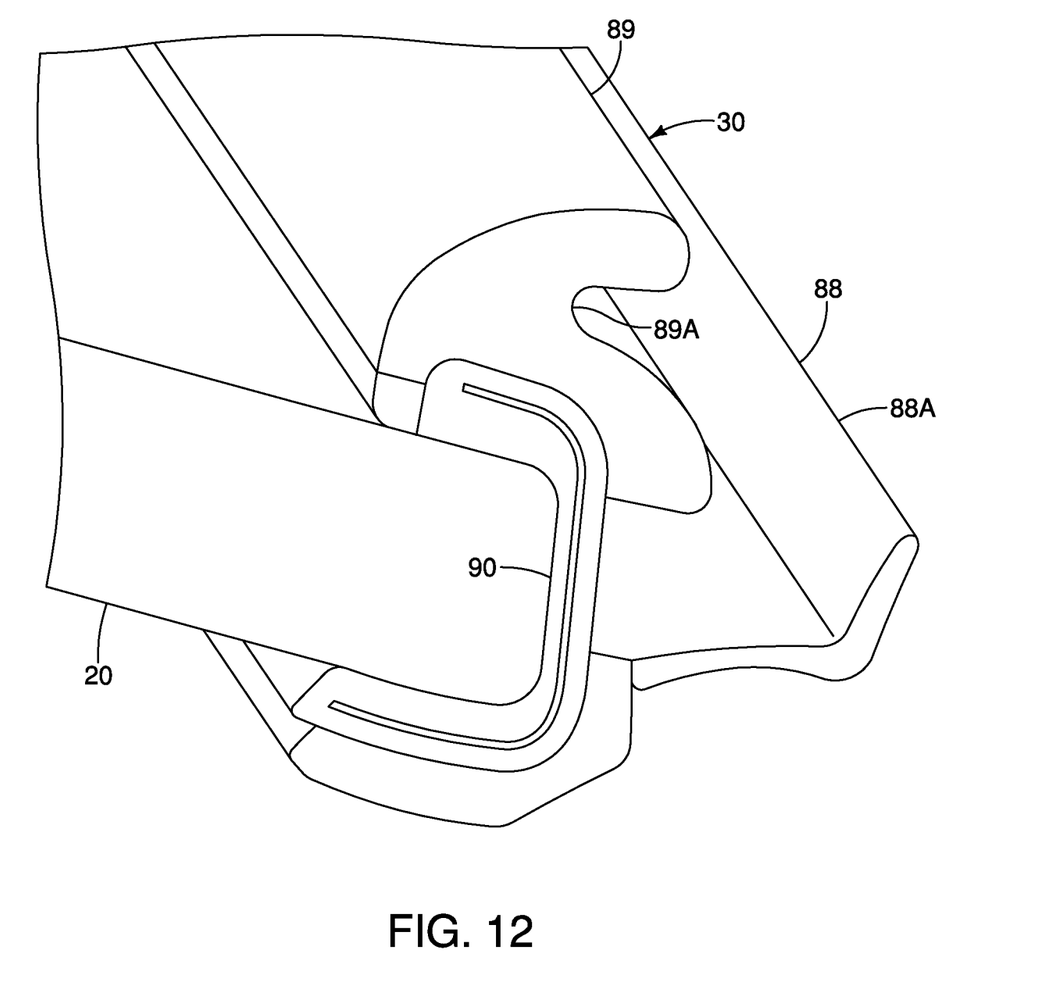
FIG. 12 is a perspective view in cross section of the windshield molding of FIG. 3.
Figure 13:
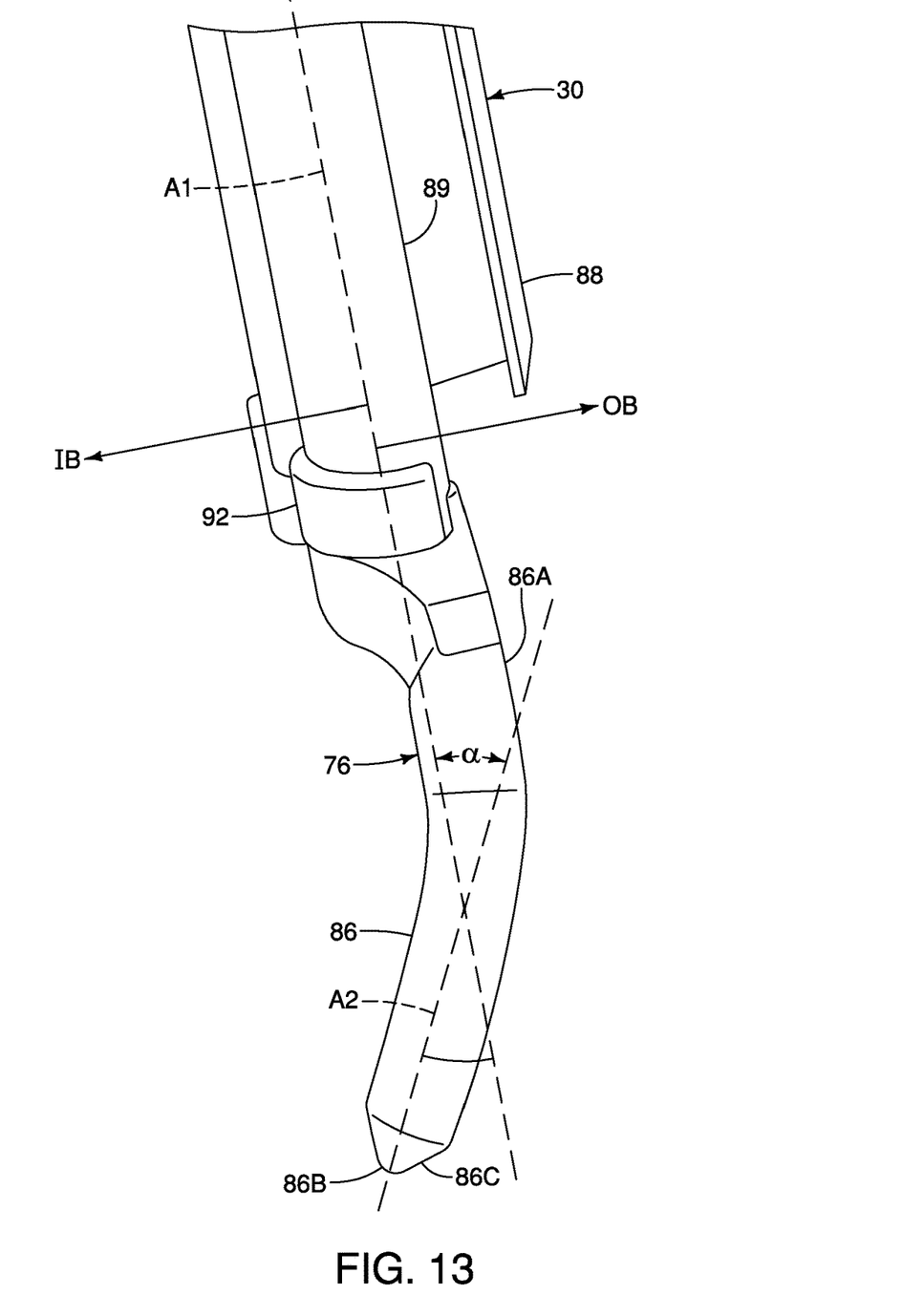
FIG. 13 is a perspective view of the hook assembly connected to the windshield molding of FIG. 3.

The windshield molding 30 is configured to receive the windshield 20, as shown in FIGS. 5-7 and 12. The windshield molding 30 engages a perimeter of the windshield 20, as shown in FIG. 3. The windshield molding 30 includes a first sealing member 88 configured to provide a seal with the body structure 14, as shown in FIGS. 12 and 13. A second receiving member 89 includes a recess 89A configured to receive an end 88A of the first sealing member 88 when the windshield 20 is assembled to the vehicle 10 (FIG. 1). The windshield molding 30 includes a receiving member 90 that is configured to receive the windshield 20. An adhesive may be disposed in the receiving member 90 to facilitate securing the windshield 20 therein. The receiving member 90 is preferably made of metal, such as stainless steel. The first and second sealing members 88 and 89 are preferably made of plastic, such as polyvinyl chloride (PVC). The first and second sealing members 88 and 89 are preferably co-extruded over the receiving member 90 to form an integral windshield molding 30.

Figure 2:
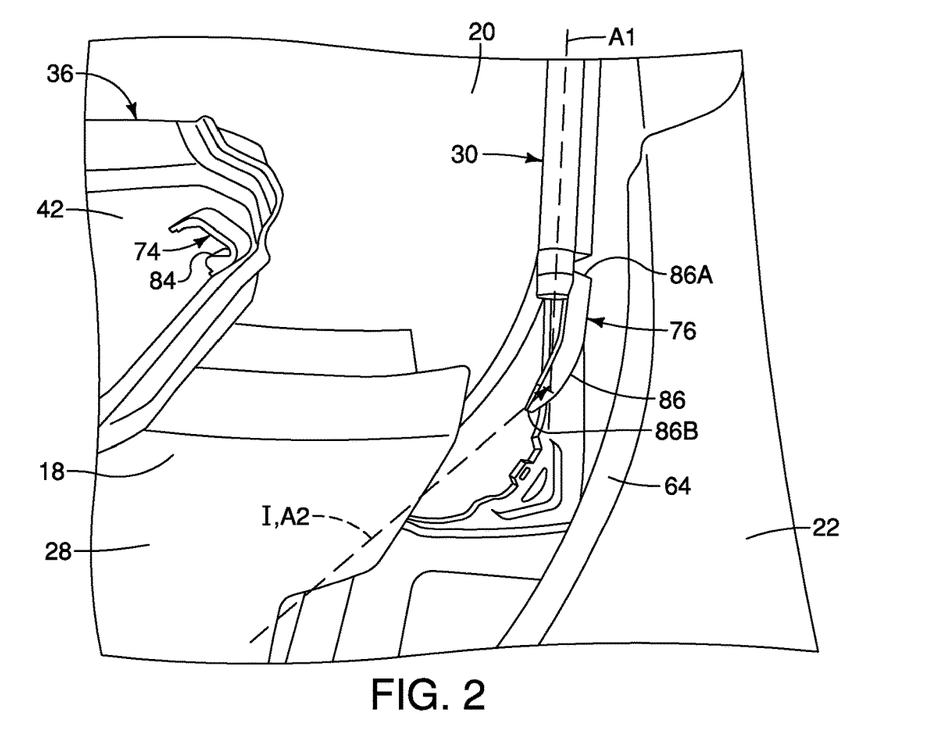
FIG. 2 is a perspective view of the vehicle of FIG. 1 prior to installation of a front fender cover.
Figure 5:
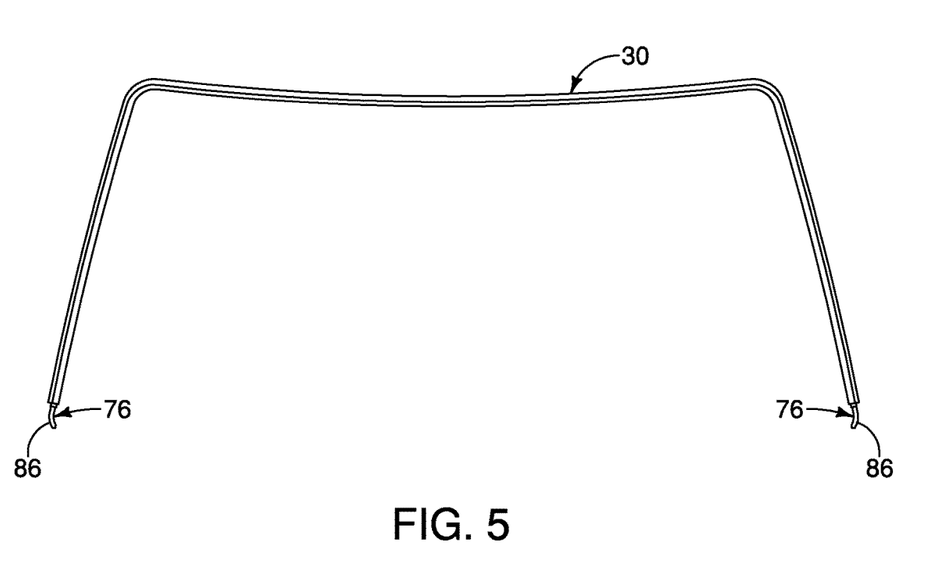
FIG. 5 is a front elevational view of a windshield molding of the front fender cover attachment assembly of FIG. 3.

The hook assembly 76 is disposed at an end of the windshield molding 30, as shown in FIGS. 5 and 13. A free end of the hook assembly 76 extends in the vehicle inboard direction, as shown in FIGS. 2 and 13. A second hook assembly 76 is disposed at the other end of the windshield molding 76. The hook assemblies 76 are substantially identical and all of the features of one is also included on the other, except that they are symmetrical mirror images of one another. A first hook assembly 76 is installed to the driver's side end of the windshield molding 30 and a second hook assembly 76 is installed to the passenger's side end of the windshield molding 30. Because the two hook assemblies 76 include substantially identical features (mirror images of one another) description of one of the hook assemblies 76 applies equally to the other of the hook assemblies 76. Therefore, only one of the hook assemblies 76 is described herein below for the sake of brevity.

The hook assembly 76 includes a connecting portion 92 connected to the end of the windshield molding 30, and the hook 86 extends from the connecting portion 92, as shown in FIG. 13. The hook 86 has a first end 86A and a second, or free, end 86B. The first end 86A of the hook 86 is disposed on a vehicle outboard side OB relative to a longitudinal axis A1 of the windshield molding 30. As shown in FIG. 2, the first end of the hook 86A is offset from the longitudinal axis A1 of the windshield molding 30. The second end 86B of the hook 86 is disposed on a vehicle inboard side IB relative to the longitudinal axis A1 of the windshield molding 30. A tip 86C at the second end 86B of the hook 86 is tapered to facilitate engaging the engaging member 74 of the fender front cover 36. A longitudinal axis A2 of the second end 86B of the hook 86 forms an angle α with the longitudinal axis A1 of the windshield molding 30. The angle α is preferably less than 90 degrees. More preferably, the angle α is approximately 40 degrees.

As shown in FIG. 13, the second end 86B of the hook 86 of the hook assembly 76 extends in the vehicle inboard direction IB. In other words, the end of the windshield molding 30 and the free end of the hook 86 of the hook assembly 76 are not parallel. As shown in FIG. 2, the hook 86 preferably has a curvature substantially equal to a curvature of the inboard flange 64 of the front fender 22 engaged by the front fender cover 36. As shown in FIG. 5, the two hooks 86 of the hook assemblies 76 extend in inboard directions toward one another. In other words, the two hooks 86 are not parallel to one another.

The hook assembly 76 is preferably formed as a unitary, one-piece member overmolded onto the end of the windshield molding 30.

During installation of the front fender cover 36, the front fender cover 36 is installed in an installation direction I, as shown in FIG. 2. The installation direction I is aligned with the axis A2 of the hook 86 of the hook assembly 76, as shown in FIGS. 2 and 13. Conventionally, the first and second axes of the windshield molding and the hook 86 are parallel, such that installation direction I of the front fender cover is difficult because the installation direction and the hook axis are not aligned. By providing the angle α between the first axis A1 of the windshield molding 30 and the second axis A2 of the hook 86 in accordance with exemplary embodiments of the present invention, the second end 86B of the hook 86 is aligned with the installation direction I of front fender cover 36, thereby facilitating installation of the front fender cover 36.

The engaging member 74 of the front fender cover 36 is engaged with the hook 86 of the hook assembly 76 connected to the windshield molding 30. The tapered tip 86C of the hook 86 facilitates engaging the hook 86 with the engaging member 74. As shown in FIGS. 9 and 10, the protrusion 84 of the engaging member 74 engages and presses downwardly on the hook 86 to securely retain the hook 86. As shown in FIG. 9, the hook 86 passes completely through the engaging member 74.

The snap-fitting projection 68 is fitted to the portion 28a of the vehicle cowl cover 28, as shown in FIG. 7, to securely connect the front fender cover to the cowl cover 28. The fender attachment structure 60 of the front fender cover 36 is received by the elongated recess 62 along the inboard edge flange 64 of the front fender 22, as shown in FIGS. 7, 9 and 10. The second plastic portion 36B, as shown in FIG. 10, is disposed on a vehicle outboard side of the flange 64, and engages an outboard side of the flange 64. As shown in FIG. 8, a plurality of snap connections 94 further secure the front fender cover 36 to the front fender 22.

The other front fender cover 36 is installed in a substantially similar manner. The other hook assembly 74 connected to the other end of the windshield molding 30 is similarly configured, thereby facilitating installation of the other front fender cover 36.

The installed front fender cover 36 is held in place by at least the snap-fitting projection 68 received by opening of the portion 28a of the cowl cover 28, the fender attachment structure 60 (an elongated projection) received by the elongated recess 62 of the front fender 22, contact between the windshield contacting lip 72 and the windshield 22, and the engagement between the engaging member 74 and the windshield molding 30. Each of these connections between the front fender cover 36 and other elements of the vehicle body structure 14 facilitates that the front fender cover 36 remains in a desired orientation relative to the cowl area 18, the windshield 20, the front fender 22 and the hood 26.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the front fender cover attachment assembly. Accordingly, these terms, as utilized to describe the present invention should be interpreted relative to a vehicle equipped with the front fender cover attachment assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A front fender cover attachment assembly comprising:
a windshield molding configured to receive a windshield;
a hook assembly connected to an end of the windshield molding;
a front fender cover configured to engage the hook assembly of the windshield molding, and
an engaging member connected to the front fender cover and configured to engage the hook assembly,
a free end of the hook assembly extending in a vehicle inboard direction.

2. The front fender cover attachment assembly according to claim 1, wherein
the hook assembly includes a connecting portion connected to the end of the windshield molding and a hook extending from the connecting portion, the hook having a first end and a second end, the first end of the hook being disposed on a vehicle outboard side relative to a longitudinal axis of the windshield molding and the second end of the hook being disposed on a vehicle inboard side relative to the longitudinal axis.

3. The front fender cover attachment assembly according to claim 1, wherein
a tip of the hook is tapered to facilitate engaging the engaging member.

4. The front fender cover attachment assembly according to claim 1, wherein
the hook assembly is overmolded onto the end of the windshield molding.

5. The front fender cover attachment assembly according to claim 1, wherein
the front fender cover includes a first plastic portion and a second plastic portion, the engaging member being connected to the first plastic portion.

6. The front fender cover attachment assembly according to claim 5, wherein
the first plastic portion is made of a hard plastic material, and the second plastic portion is made of a soft plastic material.

7. The front fender cover attachment assembly according to claim 1, wherein
the engaging member is substantially U-shaped.

8. The front fender cover attachment assembly according to claim 2, wherein
a protrusion extends from the engaging member, the protrusion being configured to contact the hook when the hook is received by the engaging member.

9. The front fender cover attachment assembly according to claim 8, wherein
the engaging member has an upper leg and a lower leg, the protrusion extending from an inner surface of the upper leg.

10. The front fender cover attachment assembly according to claim 1, wherein
the engaging member is disposed on an outboard surface of the front fender cover.

11. A front fender cover attachment assembly for a vehicle comprising:
a windshield;
a cowl cover supporting the windshield;
a windshield molding engaging a perimeter of the windshield;
a first hook assembly connected to a first end of the windshield molding;
a first front fender cover engaging the first hook assembly of the windshield molding and connected to the cowl cover, and
a first engaging member connected to the first front fender cover engaging the first hook assembly,
a first free end of the first hook assembly extending in a vehicle inboard direction.

12. The front fender cover attachment assembly according to claim 11, wherein
the first front fender cover includes a first plastic portion and a second plastic portion, the first engaging member being connected to the first plastic portion.

13. The front fender cover attachment assembly according to claim 12, wherein
the first plastic portion is made of a hard plastic material, and the second plastic portion is made of a soft plastic material.

14. The front fender cover attachment assembly according to claim 13, wherein
the second plastic portion is disposed on a vehicle outboard side of a flange of a front fender, and the second plastic portion engages an outboard side of the flange.

15. The front fender cover attachment assembly according to claim 14, wherein
the first hook assembly includes a first connecting portion connected to the first end of the windshield molding and a first hook extending from the first connecting portion.

16. The front fender cover attachment assembly according to claim 15, wherein
a curvature of the first hook is substantially equal to a curvature of the flange.

17. The front fender cover attachment assembly according to claim 15, wherein
the first hook has a first end and a second end, the first end of the first hook being disposed on a vehicle outboard side relative to a longitudinal axis of the windshield molding and the second end of the first hook being disposed on a vehicle inboard side relative to the longitudinal axis.

18. The front fender cover attachment assembly according to claim 15, further comprising
a second hook assembly connected to a second end of the windshield molding;
a second front fender cover engaging the second hook assembly of the windshield molding and connected to the cowl cover; and
a second engaging member connected to the second front fender cover engaging the second hook assembly,
a second free end of the second hook assembly extending in a vehicle inboard direction.

19. The front fender cover attachment assembly according to claim 18, wherein
the second hook assembly includes a second connecting portion connected to the second end of the windshield molding and a second hook extending from the second connecting portion, the second hook not being parallel to the first hook.

20. The front fender cover attachment assembly according to claim 19, wherein the first and second engaging members are substantially U-shaped, the first and second hooks passing completely through the respective first and second engaging members.

* * * * *